(12) United States Patent
Gehman et al.

(10) Patent No.: US 7,487,407 B2
(45) Date of Patent: Feb. 3, 2009

(54) IDENTIFICATION OF ROOT CAUSE FOR A TRANSACTION RESPONSE TIME PROBLEM IN A DISTRIBUTED ENVIRONMENT

(75) Inventors: Byron Christian Gehman, Austin, TX (US); Sandra Lee Tipton, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 553 days.

(21) Appl. No.: 11/179,241

(22) Filed: Jul. 12, 2005

(65) Prior Publication Data

US 2007/0016831 A1    Jan. 18, 2007

(51) Int. Cl.
*G06F 11/00* (2006.01)
(52) U.S. Cl. .............................. 714/51; 714/26; 714/43
(58) Field of Classification Search ................. 714/26, 714/37, 43, 51, 57
See application file for complete search history.

(56) References Cited

U.S. PATENT DOCUMENTS

| | | | | |
|---|---|---|---|---|
| 3,704,363 | A * | 11/1972 | Salmassy et al. | 714/704 |
| 5,504,921 | A * | 4/1996 | Dev et al. | 709/223 |
| 5,819,028 | A * | 10/1998 | Manghirmalani et al. | 714/57 |
| 6,006,016 | A * | 12/1999 | Faigon et al. | 714/48 |
| 6,072,777 | A * | 6/2000 | Bencheck et al. | 370/244 |
| 6,618,823 | B1 * | 9/2003 | West | 714/25 |
| 6,701,459 | B2 * | 3/2004 | Ramanathan et al. | 714/37 |
| 6,718,486 | B1 | 4/2004 | Roselli et al. | 714/41 |
| 6,721,907 | B2 | 4/2004 | Earl | 714/57 |
| 6,738,933 | B2 * | 5/2004 | Fraenkel et al. | 714/47 |
| 6,823,356 | B1 | 11/2004 | Novaes et al. | 709/201 |
| 6,915,457 | B1 * | 7/2005 | Miller | 714/43 |
| 6,968,292 | B2 * | 11/2005 | Boyer | 702/182 |
| 7,062,683 | B2 * | 6/2006 | Warpenburg et al. | 714/43 |
| 2002/0198984 | A1 * | 12/2002 | Goldstein et al. | 709/224 |
| 2003/0014698 | A1 * | 1/2003 | Schroth et al. | 714/43 |
| 2003/0225830 | A1 * | 12/2003 | Kataoka et al. | 709/203 |
| 2003/0236880 | A1 | 12/2003 | Srivastava et al. | 709/224 |
| 2004/0128587 | A1 | 7/2004 | Kenchammana-Hosekote et al. | 714/43 |
| 2004/0153703 | A1 | 8/2004 | Vigue et al. | 714/4 |
| 2005/0028043 | A1 * | 2/2005 | Loprieno | 714/43 |

* cited by examiner

*Primary Examiner*—Joshua A Lohn
(74) *Attorney, Agent, or Firm*—Duke W. Yee; Jeffrey S. LaBaw; Wayne P. Bailey

(57) ABSTRACT

Method and apparatus for identifying a cause for a response time problem for a transaction in a distributed computing system that includes a central server and a plurality of subsystems. Data is stored at each subsystem relating to subtransactions of transactions performed by the subsystems. When a problem is discovered in connection with the completion of a particular transaction, each subsystem of the plurality of subsystems that was involved in the particular transaction is identified, and both instance data relating to all of the sub-transactions of the particular transaction stored at each identified subsystem and current hourly aggregate data stored at each identified subsystem is forwarded to the central server. Root-Cause Analysis is then performed using the forwarded instance data and aggregate data to identify the particular subsystem that caused the transaction problem.

15 Claims, 6 Drawing Sheets

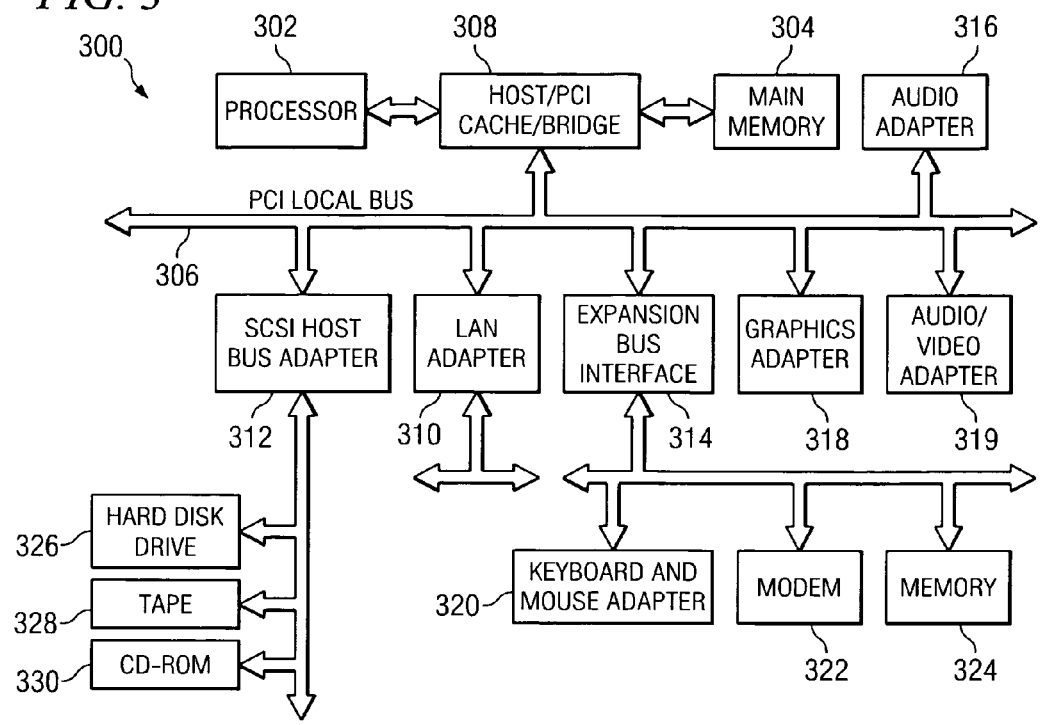
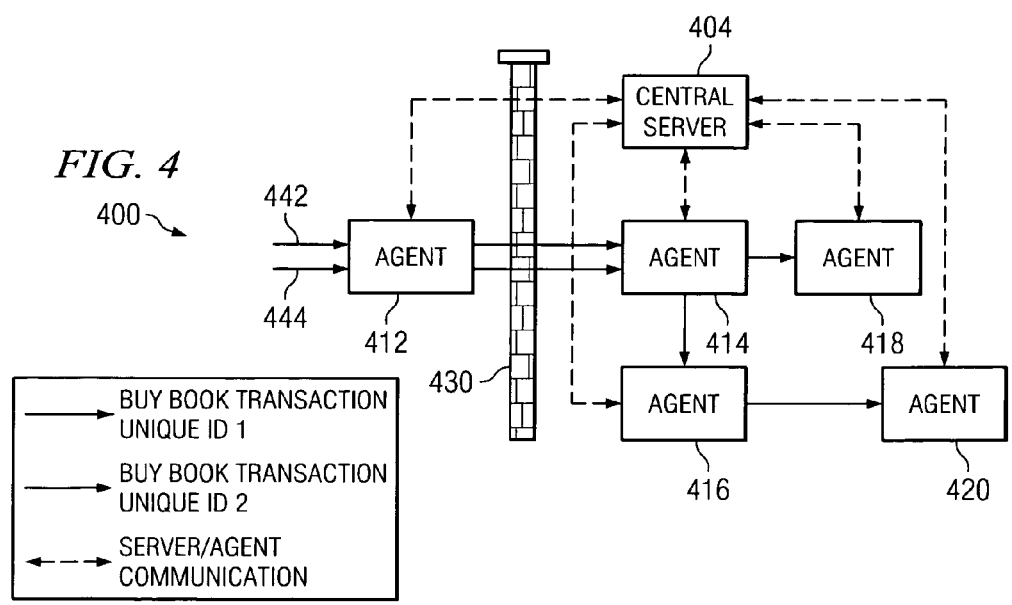

IDENTIFICATION OF ROOT CAUSE FOR A TRANSACTION RESPONSE TIME PROBLEM IN A DISTRIBUTED ENVIRONMENT

BACKGROUND OF THE INVENTION

1. Field of the Invention

The present invention relates generally to the data processing field and, more particularly, to a method and apparatus for identifying the cause for a transaction response time problem in a distributed computing system.

2. Description of the Related Art

Distributed computing is a type of computing in which a plurality of separate computing entities interconnected by a telecommunications network operate concurrently to run a single transaction in a transparent and coherent manner, so that the plurality of entities appear as a single, centralized system. In distributed computing, a central server divides a single transaction into a plurality of work packages which are passed to a plurality of subsystems. Each subsystem performs the particular sub-transaction detailed in the work package passed to it, and when it is finished, the completed work package is passed back to the central server. The central server compiles the completed work packages from the various subsystems and presents the results of the transaction to an end user.

In a distributed computing system, it is important to monitor the operation of each subsystem so that the root cause of any transaction response time problem that may occur can be detected and identified. A current technique for identifying the root cause of a transaction response time problem is to attach an Application Response-time Measurement (ARM) correlator to the transaction so that response time information can be gathered at each subsystem, and then correlated at the central server.

In order to reduce the amount of data that is stored locally at each subsystem to be sent over the network to the central server to be correlated, the data collected on a subsystem for each run of a transaction is aggregated over a one hour period. The locally stored aggregated data is sent to the central server on an hourly basis; and after being sent, the locally stored data is normally discarded at the subsystem. Upon completion of a transaction, if a monitor, located on a monitored server where the transaction originated, determines that the transaction exceeded a response time threshold, it will turn on a flag in the ARM correlator for subsequent runs of the transaction to save the instance data (Second Failure Data Capture) which is also needed to perform a "Root-Cause Analysis". A Root Cause Analysis cannot be performed on aggregate data alone because the granularity of aggregate data is too high and, thus, may hide the problem. The Root-Cause Analysis must instead be performed using both the aggregate data and the instance data of the specific transaction in question. The instance data is compared to an average of the aggregate data to determine the sub-transaction that is operating outside the norm represented in the aggregate data.

There are several drawbacks to current techniques for identifying the root cause of a transaction response time problem in a distributed computing system. For one, an aggregate view of the transaction path may not isolate the subsystem where the problem is occurring if the problem is sporadic in nature. In addition, collecting subsequent instances of a transaction run may or may not identify performance problems having the same root cause. In some cases, for example, a transaction may be initiated by a different user from a different location, or may contain different parameters, all of which can impact the outcome of the transaction. Additionally, today's web server environments are often clustered and load balanced, and, as a result, a transaction may not take the same path on subsequent runs as during the actual failure. If a specific transaction path has a problem, but the transaction takes a different path the next time it is executed, the monitoring product would falsely determine that the problem has corrected itself—when, in fact, the problem will resurface once the transaction takes the original path in the future.

Another drawback to current techniques for identifying the root cause of a transaction response time problem in a distributed computing system is that current techniques rely on the user of the monitoring product to analyze the data of the aggregate transaction and the subsequent instances to identify the source of the problem. The event that is sent to the user does not itself give an indication of the cause of the problem because at the time of the event, it is not known which subsystem caused the overall transaction problem.

There is, accordingly, a need for an improved method and apparatus for identifying the cause for a transaction response time problem in a distributed computing system.

SUMMARY OF THE INVENTION

The present invention provides a method and apparatus for identifying a cause for a response time problem for a transaction in a distributed computing system that includes a central server and a plurality of subsystems. Data is stored at each subsystem relating to sub-transactions of transactions performed by the subsystems. When a problem is discovered in connection with the completion of a particular transaction, each subsystem of the plurality of subsystems that was involved in the particular transaction is identified, and both instance data relating to all of the sub-transactions of the particular transaction stored at each identified subsystem and current hourly aggregate data stored at each identified subsystem is forwarded to the central server. Root-Cause Analysis is then performed using the forwarded instance data and aggregate data to identify the particular subsystem that caused the transaction problem.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a block diagram of a data processing system that may be implemented as a client in accordance with a preferred embodiment of the present invention;

FIG. 4 is a block diagram that schematically illustrates a current architecture of an apparatus for monitoring transaction response time in a distributed computing system to assist in explaining the present invention;

DETAILED DESCRIPTION OF THE PREFERRED EMBODIMENT

Figure 1:
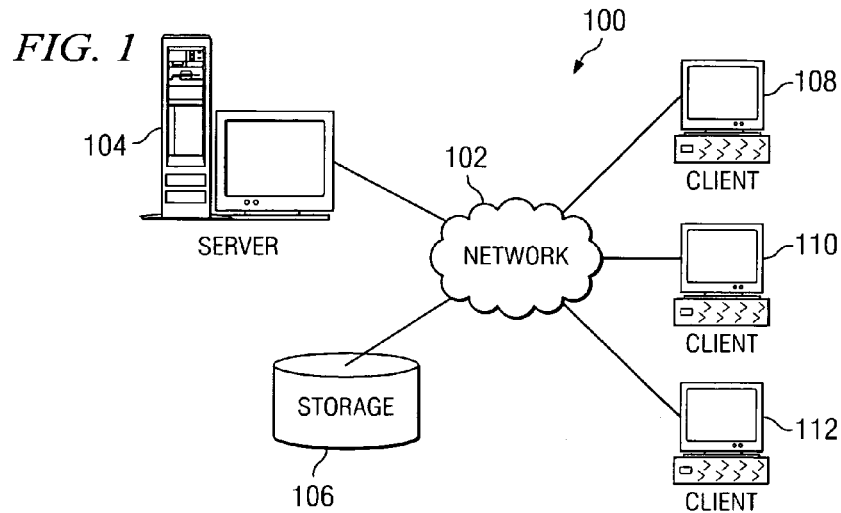
FIG. 1 is a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
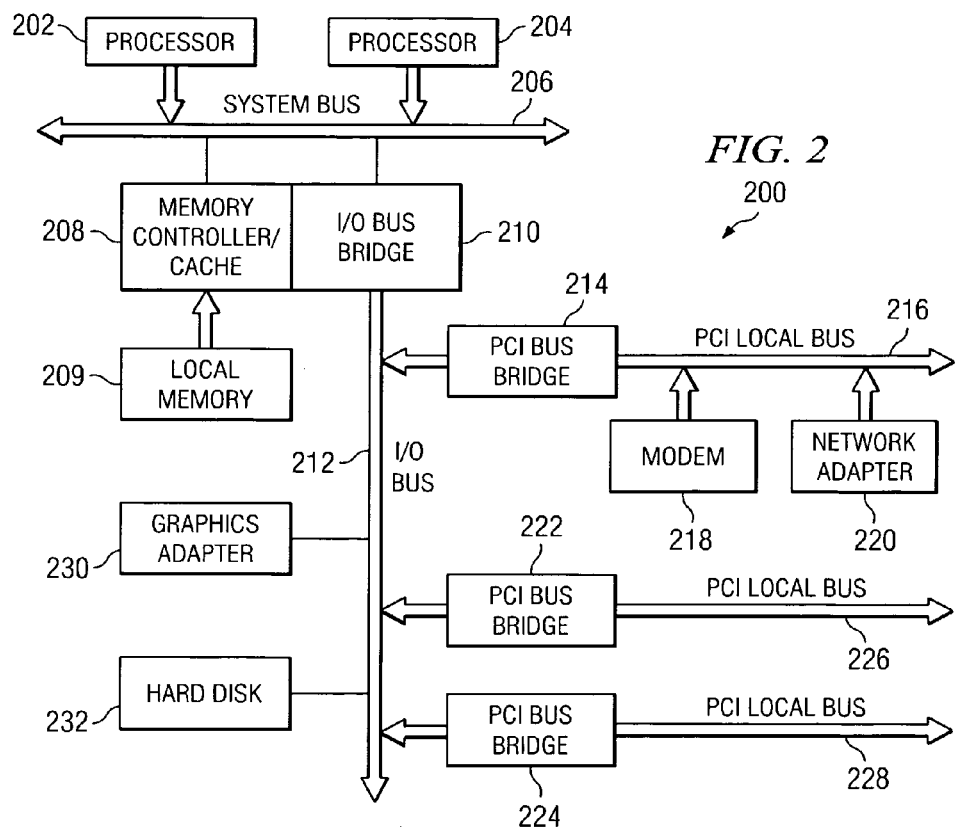
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

With reference now to FIG. 3, a block diagram of a data processing system that may be implemented as a client, such as clients 108, 110 and 112 in FIG. 1, is depicted in accordance with a preferred embodiment of the present invention. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI Bridge 308. PCI Bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3.

Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a method and apparatus for identifying the cause for a transaction response time problem in a distributed computing system. FIG. 4 is a block diagram that schematically illustrates a current architecture of an apparatus for monitoring transaction response time in a distributed computing system to assist in explaining the present invention. The monitoring apparatus is generally designated by reference number 400 and includes a central server 404, which may correspond to server 104 in FIG. 1, and a plurality of subsystems (not shown in FIG. 4) which may correspond to client computers 108-112 in FIG. 1. The plurality of subsystems may, for example, represent web servers, web application servers, database servers, custom applications, and the like.

An agent 412-420 is located on and associated with each subsystem. Each agent 412-420 records the response time and additional metrics for a sub-transaction of a transaction performed by its associated subsystem. FIG. 4 also illustrates a simple example of the various paths a transaction can take across various subsystems. In particular, FIG. 4 schematically illustrates two transactions 442 and 444 received from a user (not shown). Transactions 442 and 444 may, for example, be "Buy Book" transaction 1 (Unique ID 1) and "Buy Book" transaction 2 (Unique ID 2), respectively.

As indicated by the solid line arrows in FIG. 4, transactions 442 and 444 go from agent 412 across firewall 430 to agent 414, from agent 414, to agents 416 and 418, and from agent 416 to agent 420.

As indicated by the dashed line arrows in FIG. 4, monitoring apparatus 400 allows for 2-way communication between each agent 412-420 and central server 404. The monitoring apparatus does not, however, provide for communication between agents.

In current monitoring mechanisms, instance data is not normally collected because of the high impact on the agent machine. Instead, if a monitor on the monitored agent where the transaction originated determines that a transaction exceeded the response time threshold, it will turn on a flag in an ARM correlator for subsequent runs of the transaction to save the instance data (Second Failure Data Capture). Aggregate data, on the other hand, is always collected and stored (since it is low impact).

Current techniques for identifying the root cause of a transaction response time problem in a distributed computing system provide an aggregate view of the transaction path which may not isolate the subsystem where the problem is occurring if the problem is sporadic in nature. In addition, collecting subsequent instances of a transaction run may or may not identify performance problems having the same root cause. This may be because the transaction could take a different path the next time, or the problem may have corrected itself, or a different problem may manifest itself on the second run. Because of these and, perhaps, other reasons, First Failure Capture Data can provide a more accurate Root-Cause Analysis than second Failure Capture Data. Also, current techniques rely on the user to analyze the data of the aggregate transaction, and the subsequent instances to identify the source of the problem.

The present invention provides a method and apparatus for identifying the cause for a transaction response time problem in a distributed computing system that may utilize the monitoring architecture illustrated in FIG. 4, but that allows the subsystem responsible for a transaction response time problem to be identified without requiring user involvement.

In particular, when the central server receives a notification that a particular transaction has a response time problem, the notification does not include information about the path the instance of the transaction traversed through the various subsystems. According to one aspect of present invention, however, the first time an agent of a subsystem receives a correlator for a specific policy identifier, it notifies the server that it is a participant in the transaction flow for this policy (A policy is a set of rules that identifies a particular transaction). For example, a URL or a URL pattern could be specified as a policy to identify a "Buy Book" transaction such as illustrated in FIG. 4. Because the server will know which of the agents it is monitoring are potentially involved in the execution of the violating transaction instance, the server will be able to query all agents that are participating in a policy to send up its instance data. The server will request that all potentially involved agents send up any and all of their instance data and aggregate data for any sub-transactions containing the unique transaction instance identifier. Although not all agents that are participating in a policy will be involved in the transaction flow for a particular unique transaction, this procedure will reduce the number of agents from which the server must request information.

According to a further aspect of the present invention, as the agent on each subsystem is called with an indication that a sub-transaction has been completed, the sub-transaction data will be inserted into a queue in memory at the agent. Inasmuch as there is some concern about memory growth on the agents on each subsystem, due to the sheer volume of transactions, an intelligent queuing mechanism is provided to properly manage the amount of data to be retained in memory at each agent.

Figure 5:
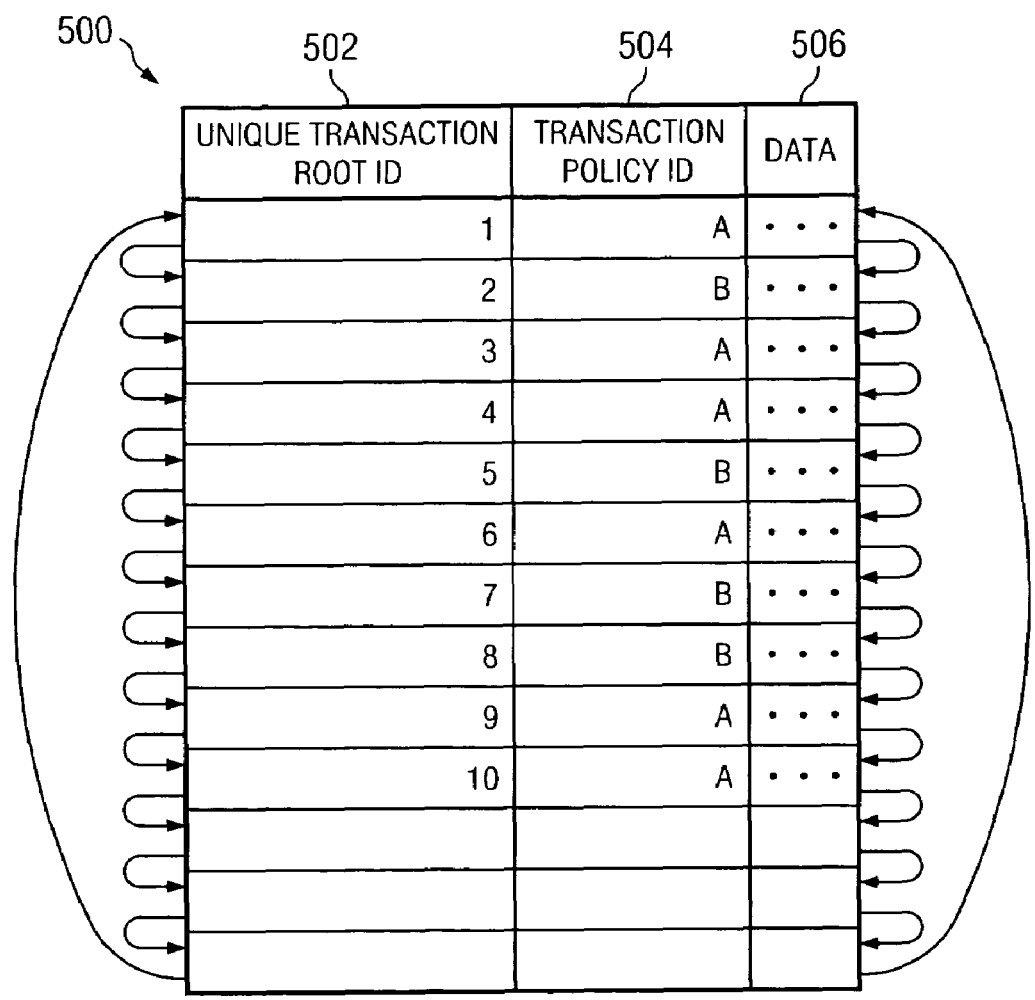
FIG. 5 schematically illustrates a queuing mechanism for storing performance data for a subsystem of a distributed computing system according to a preferred embodiment of the present invention.

FIG. 5 schematically illustrates a queuing mechanism for storing performance data for a subsystem of a distributed computing system according to a preferred embodiment of the present invention. In particular; FIG. 5 schematically illustrates a queue 500 that is provided on each agent, such as agents 412-420 illustrated in FIG. 4 that are associated with each subsystem of the distributed computing system. As shown in FIG. 5, queue 500 is in the form of a circular doubly linked list. The circularity limits memory growth, while the doubly linked list allows data to be removed from any location in the list and to maintain a time sequential ordering of the list.

Queue 500 on an agent stores data for a sub-transaction performed by the subsystem associated with that agent. As shown in FIG. 5, such stored data includes the unique transaction root ID 502 that was passed with each transaction in the ARM correlator, a policy ID 504 that was also included in the ARM correlator, and data 506 collected for the sub-transaction performed by the subsystem.

At the time data relating to the performance of the associated subsystem is put on the queue, it is not known whether the data will be required by the central server. In particular, even though a particular transaction performance problem may be identified on a particular agent, the threshold determination of whether or not a transaction response time problem has occurred is made on the overall transaction where the transaction originated. Although it is possible for thresholds to be placed on sub-transactions, this is a manual step, and impacts the performance of the agents. From a usability and performance perspective, therefore, it is advantageous for the transaction threshold to be determined for the overall transaction, and for the central server to then analyze and determine where in the transaction path a problem has occurred.

When a problem is identified at the agent where the threshold was violated, an event is sent to the central server by the agent. If the transaction completes successfully, no event is sent to the server. The event sent to the server contains the unique identifier of the transaction, and the identifier of the transaction policy. The server then uses the policy identifier to notify the agents of all other subsystems that potentially ran the transaction. The notice sent to the agents will include the policy identifier and the unique transaction identifier.

Figure 6:
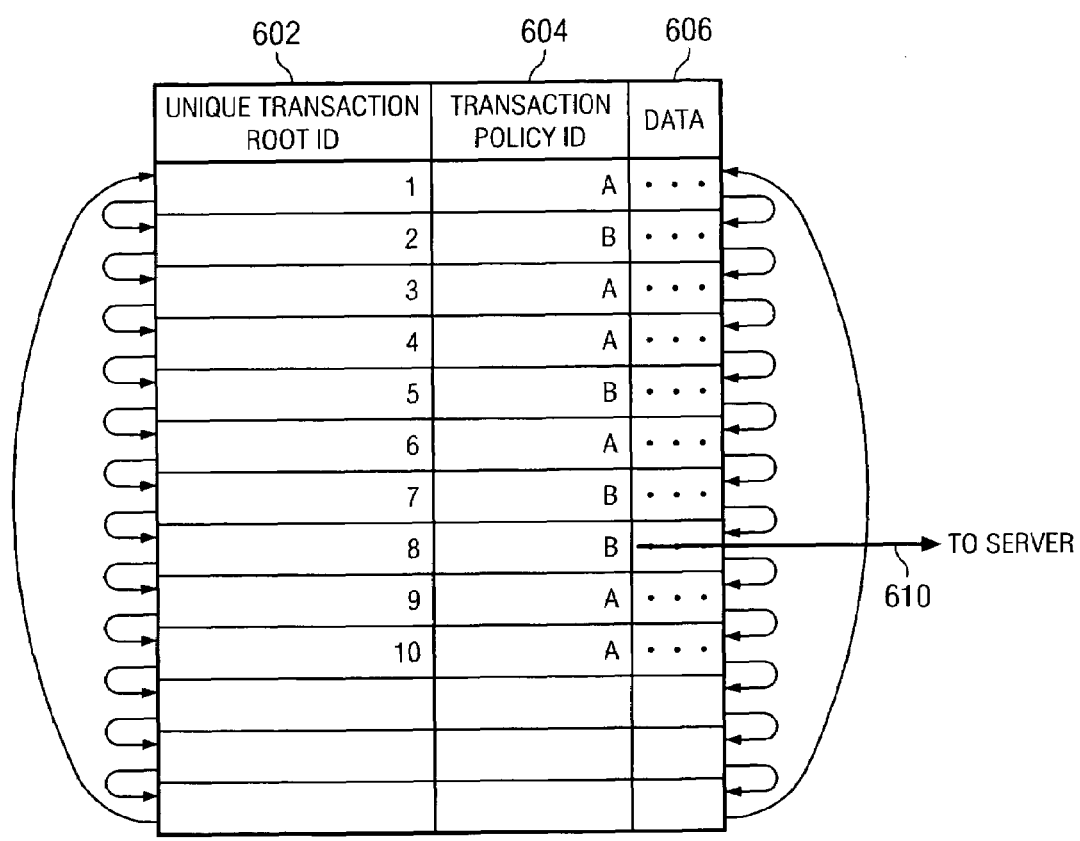
FIGS. 6, 7 and 8 explain, by way of an example, operation of the queuing mechanism of FIG. 5 to identify the cause of a transaction response time problem according to a preferred embodiment of the present invention.
Figure 7:
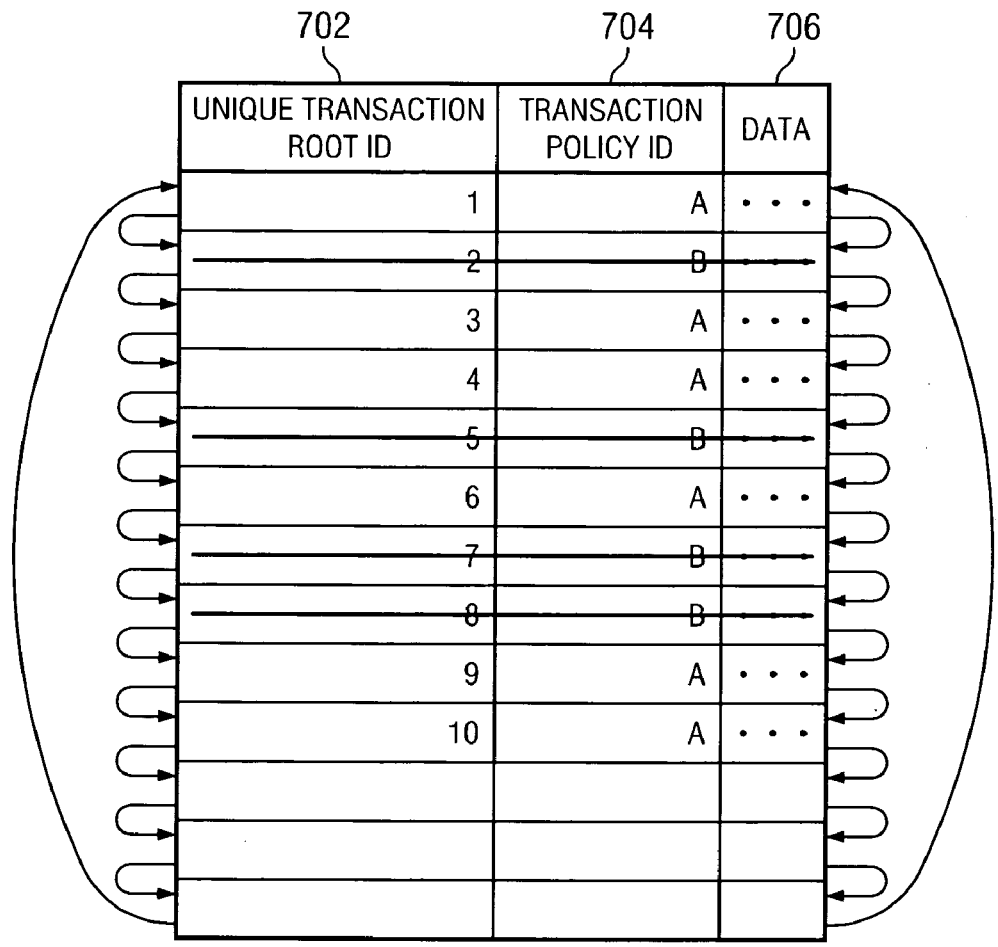
Figure 8:
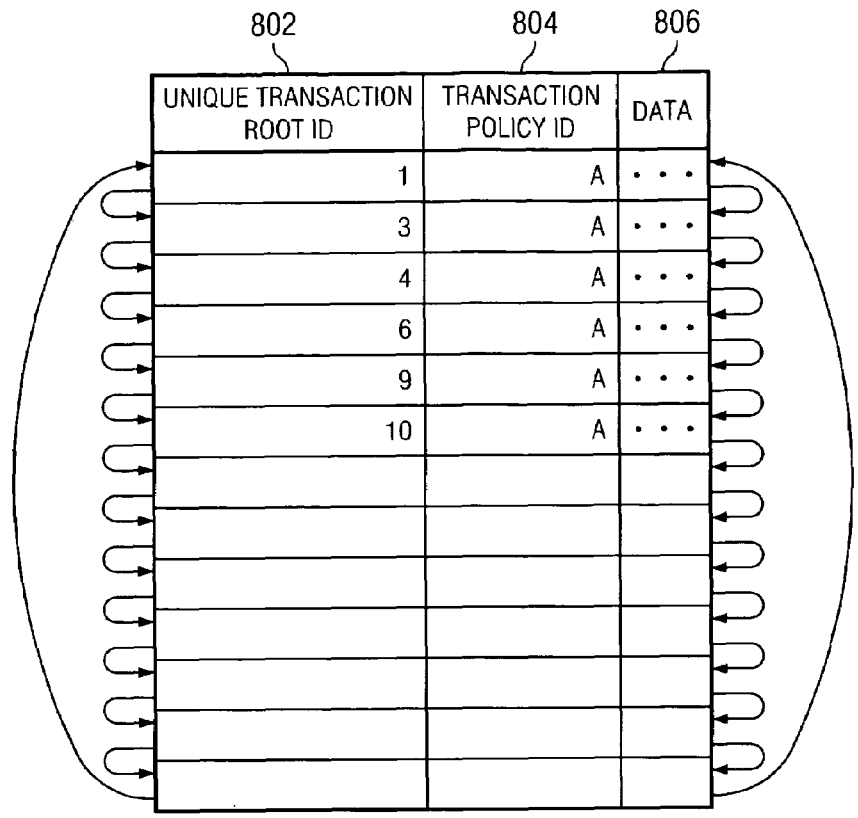

FIGS. 6, 7 and 8 explain, by way of an example, operation of the queuing mechanism of FIG. 5 to identify the cause of a transaction response time problem according to a preferred embodiment of the present invention. In particular, when an agent receives a request from the central server for transaction instance data for a failed transaction, the agent looks for the pertinent entries in its queue by using the unique identifier. If the agent locates a transaction instance, it will remove it from the queue and send the transaction instance data to the central server.

FIG. 6 illustrates an example where an agent receives a request for data from the central server for a transaction having a unique transaction ID of 8. (The unique transaction ID changes every time the transaction "originates" but is the same for all downstream sub-transactions. The ID is part of the correlator that is flowed between the sub-transactions). The agent searches for any entries in its queue that matches the transaction root ID, and sends the found entry to the central server as indicated by arrow 610 in FIG. 6.

Optionally, the agent may also remove all transactions in the queue that match the policy identifier, since it has not received a request for previous instances of the transactions, and it can be assumed that the previous transactions completed successfully.

FIG. 7 illustrates an agent identifying sub-transactions that belong to the same policy as the one requested as shown in FIG. 6 (Transaction Policy "B"), and marks the sub-transactions designated as belonging to Policy B for deletion. FIG. 8 illustrates the resulting queue for the agent after deletion of all sub-transactions from the queue having transaction policy ID "B". As shown in FIG. 8, only sub-transactions having a policy ID of "A" remain in the queue.

Intelligent queuing in accordance with the present invention will increase the probability that first failure data is captured and retained until pulled by the central server. In addition, an administration and configuration capability is preferably included to allow the user to increase this probability by specifying larger queue sizes on subsystems with heavy transaction traffic. Providing the capability to specify which transactions should capture first failure information will also increase the probability that the transaction data is on the queue when requested from the server.

Once the central server receives notification from all the agents in the distributed computing system, it will correlate the transaction data, and compare the transaction instance data for each subtransaction, with an average of the aggregate data for the sub-transaction (the aggregate data also contains other information including minimum and maximum durations and other statistics), using appropriate Root-Cause Analysis algorithms, to determine which sub-transaction, and, therefore, which subsystem caused the transaction problem.

The server can then graphically display the transaction flow of the transaction instance that failed, and identify on the transaction path, the subsystem where the problem occurred without having to recreate the problem (i.e. by using First Failure Data Capture rather than Second Failure Data Capture).

Figure 9:
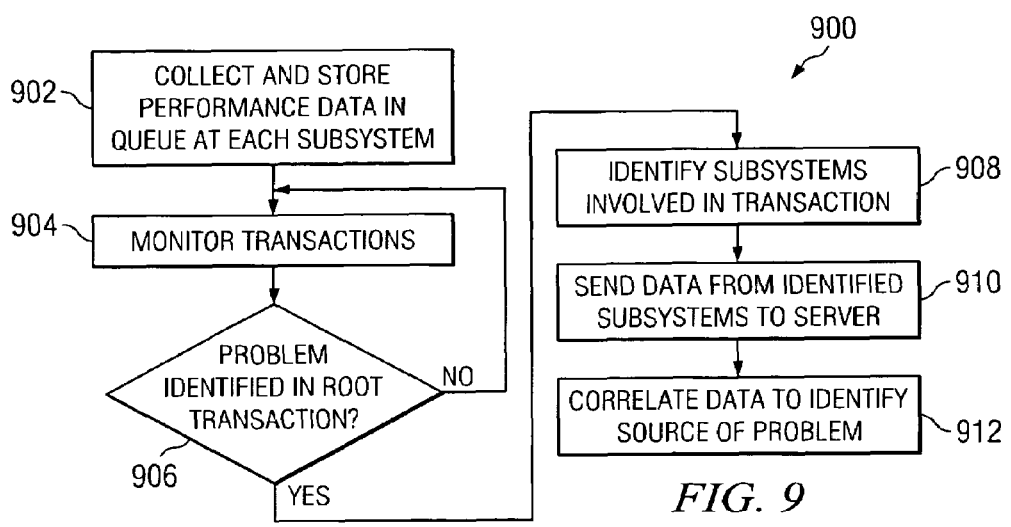
FIG. 9 is a flowchart that illustrates a method for identifying the cause of a transaction response time problem in a distributed computing system according to a preferred embodiment of the present invention.

FIG. 9 is a flowchart that illustrates a method for identifying the cause of a transaction response time problem in a distributed computing system according to a preferred embodiment of the present invention. The method is generally designated by reference number 900, and begins by storing data at each subsystem relating to sub-transactions of transactions performed by the subsystems (Step 902). Transactions are monitored (Step 904), and a determination is made if a problem has occurred in connection with completion of a transaction (Step 906). If a problem has not occurred (No output of Step 906), the monitoring process continues for subsequent transactions. If a problem has occurred in connection with completion of a transaction (Yes output of Step 906), each subsystem of the plurality of subsystems involved in the problem transaction is identified (Step 908). Instance data relating to the sub-transaction of the problem transaction stored at each identified subsystem of the plurality of subsystems involved in the transaction as well as current hourly aggregate data stored at each identified subsystem is sent to the central server (Step 910). Root Cause Analysis is then performed comparing an average of the aggregated data with the instance data forwarded from each identified subsystem to identify the particular subsystem that caused the transaction problem (Step 912).

Embodiments of the present invention thus provide a method and apparatus for identifying the root cause of a performance problem in an end user transaction in a distributed computing system that includes a central server and a plurality of subsystems. Data is stored at each subsystem relating to sub-transactions of transactions performed by the subsystems. When a problem is discovered in connection with the completion of a particular transaction, each subsystem of the plurality of subsystems that was involved in the particular transaction is identified, and both instance data relating to all of the sub-transactions of the particular transaction stored at each identified subsystem and current hourly aggregate data stored at each identified subsystem is forwarded to the central server. Root-Cause Analysis is then performed using the forwarded instance data and aggregate data to identify the particular subsystem that caused the transaction problem.

It is important to note that while embodiments of the present invention have been described in the context of a fully functioning data processing system, those of ordinary skill in the art will appreciate that the processes of embodiments of the present invention are capable of being distributed in the form of a computer usable medium of instructions and a variety of forms and that embodiments of the present invention apply equally regardless of the particular type of signal bearing media actually used to carry out the distribution. Examples of computer usable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer usable media may take the form of coded formats that are decoded for actual use in a particular data processing system.

The description of embodiments of the present invention have been presented for purposes of illustration and description, and were not intended to be exhaustive or limited to the invention in the form disclosed. Many modifications and variations will be apparent to those of ordinary skill in the art. The embodiments were chosen and described in order to best explain the principles of the invention, the practical application, and to enable others of ordinary skill in the art to understand the invention for various embodiments with various modifications as are suited to the particular use contemplated.

What is claimed is:

1. A method for identifying a cause for a response time problem for a transaction in a distributed computing system that includes a central server and a plurality of subsystems, where a single transaction is divided into a plurality of sub-transactions and each sub-transaction is sent to a given subsystem of the plurality of subsystems, the method comprising:

storing data, by an agent at each subsystem, relating to the sub-transactions performed by the subsystems, wherein the data is stored at the each subsystem in a queue that contains transaction instance data for multiple different transactions that have been processed by the each subsystem, wherein the transaction instance data is specific data generated for a given sub-transaction processed by the subsystem;

discovering a problem in connection with completion of a particular transaction;

identifying the each subsystem of the plurality of subsystems involved in the particular transaction using at least one identifier stored at the each subsystem, wherein the at least one identifier includes a first identifier uniquely identifying the particular transaction, and a second identifier identifying a policy associated with the particular transaction;

forwarding the data stored at each identified subsystem to the central server, the forwarded data including instance data relating to the sub-transaction of the particular transaction performed by the identified subsystems and aggregate data relating to sub-transactions of transactions performed by the identified subsystems; and performing a Root-Cause Analysis using the forwarded aggregate data and the forwarded instance data to identify the subsystem that caused the response time problem with the particular transaction.

2. The method according to claim 1, wherein the each subsystem notifies the central server of the second identifier contained in an initial correlator for a given sub-transaction that is received by the each subsystem.

3. The method according to claim 1, wherein the storing step comprises:

storing data at the each subsystem relating to sub-transactions of transactions performed by the subsystems in a circular doubly linked in-memory queue.

4. The method according to claim 3, and further comprising:

specifying a size of the queue at the each subsystem as a function of transaction traffic.

5. The method according to claim 1, wherein the instance data comprises First Failure Data Capture data.

6. The method according to claim 1, wherein the aggregate data comprises current hourly aggregate data.

7. A computer program product, comprising computer executable instructions embodied in a computer usable, recordable-type medium, for identifying a cause for a response time problem for a transaction in a distributed computing system that includes a central server and a plurality of subsystems, where a single transaction is divided into a plurality of sub-transactions and each sub-transaction is sent to a given subsystem of the plurality of subsystems, the computer program product comprising:

first instructions for storing data, by an agent at each subsystem, relating to the sub-transactions performed by the subsystems, wherein the data is stored at the each subsystem in a queue that contains transaction instance data for multiple different transactions that have been processed by the each subsystem, wherein the transaction instance data is specific data generated for a given sub-transaction processed by the subsystem;

second instructions for discovering a problem in connection with completion of a particular transaction;

third instructions for identifying the each subsystem of the plurality of subsystems involved in the particular transaction using at least one identifier stored at the each subsystem, wherein the at least one identifier includes a first identifier uniquely identifying the particular transaction, and a second identifier identifying a policy associated with the particular transaction;

fourth instructions for forwarding the data stored at each identified subsystem to the central server, the forwarded data including instance data relating to the sub-transaction of the particular transaction performed by the identified subsystems and aggregate data relating to sub-transactions of transactions performed by the identified subsystems; and fifth instructions for performing a Root-Cause Analysis using the forwarded aggregate data and the forwarded instance data to identify the subsystem that caused the response time problem with the particular transaction.

8. The computer program product according to claim 7, wherein the each subsystem notifies the central server of the second identifier contained in an initial correlator for a given sub-transaction that is received by the each subsystem.

9. The computer program product according to claim 7, wherein the first instructions comprises:

instructions for storing data at the each subsystem relating to sub-transactions of transactions performed by the subsystems in a circular doubly linked queue.

10. The computer program product according to 9, and further comprising:

sixth instructions for specifying a size of the queue at the each subsystem as a function of transaction traffic.

11. An apparatus for identifying a cause for a response time problem for a transaction in a distributed computing system that includes a central server and a plurality of subsystems, where a single transaction is divided into a plurality of sub-transactions and each sub-transaction is sent to a given subsystem of the plurality of subsystems, the apparatus comprising:

an agent at each subsystem for storing data relating to the sub-transactions performed by the subsystems, wherein the data is stored at the each subsystem in a queue that contains transaction instance data for multiple different transactions that have been processed by the subsystem, wherein the transaction instance data is specific data generated for a given sub-transaction processed by the subsystem;

a mechanism for discovering a problem in connection with completion of a particular transaction;

an identifying mechanism for identifying the each subsystem of the plurality of subsystems involved in the particular transaction using at least one identifier stored at the each subsystem, wherein the at least one identifier includes a first identifier uniquely identifying the particular transaction, and a second identifier identifying a policy associated with the particular transaction;

a forwarding mechanism for forwarding the data stored at each identified subsystem to the central server, the forwarded data including instance data relating to the sub-transaction of the particular transaction performed by the identified subsystems and aggregate data relating to sub-transactions of transactions performed by the identified subsystems; and an analyzer at the central server for performing a Root-Cause Analysis using the forwarded aggregate data and the forwarded instance data to identify the subsystem that caused the response time problem with the particular transaction.

12. The apparatus according to claim 11, wherein the each subsystem notifies the central server of the second identifier contained in an initial correlator for a given sub-transaction that is received by the each subsystem.

13. The apparatus according to claim 11, wherein the agent at the each subsystem includes a circular doubly linked in-memory queue for storing the data relating to sub-transactions of transactions performed by the subsystems.

14. The apparatus according to claim 11, wherein the instance data comprises First Failure Data Capture data.

15. The apparatus according to claim 11, wherein the aggregate data comprises current hourly aggregate data.

* * * * *